(12) United States Patent
Sugiyama (10) Patent No.: US 11,352,285 B2
(45) Date of Patent: *Jun. 7, 2022

(54) SLUDGE DRYING APPARATUS

(71) Applicant: DISCO CORPORATION, Tokyo (JP)

(72) Inventor: Satoshi Sugiyama, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 98 days.

This patent is subject to a terminal disclaimer.

(21) Appl. No.: 16/677,148

(22) Filed: Nov. 7, 2019

(65) Prior Publication Data

US 2020/0148570 A1 May 14, 2020

(30) Foreign Application Priority Data

Nov. 14, 2018 (JP) .............................. JP2018-213702

(51) Int. Cl.
| | |
|---|---|
| *C02F 11/16* | (2006.01) |
| *B24B 55/06* | (2006.01) |
| *C02F 11/15* | (2019.01) |
| *C02F 103/34* | (2006.01) |

(52) U.S. Cl.
CPC .............. *C02F 11/16* (2013.01); *B24B 55/06* (2013.01); *C02F 11/15* (2019.01); *C02F 2103/34* (2013.01)

(58) Field of Classification Search
CPC .......... B24B 55/06; C02F 11/12; C02F 11/15; C02F 11/16; C02F 2103/34
See application file for complete search history.

(56) References Cited

FOREIGN PATENT DOCUMENTS

| | | |
|---|---|---|
| JP | 2013119050 A | 6/2013 |
| JP | 2016049506 A | 4/2016 |
| JP | 2016049506 A * | 4/2016 |

* cited by examiner

*Primary Examiner* — Brad Gordon
(74) *Attorney, Agent, or Firm* — Greer Burns & Crain Ltd.

(57) ABSTRACT

A sludge drying apparatus includes a drying unit for drying sludge as it is transferred by a transfer belt. The drying unit includes a box that covers an upper surface of the transfer belt and extends in a direction of extension of the transfer belt, an air inlet formed at one end of the box, an air outlet formed at the other end of the box, a fan provided outside the box for sucking air in the box from the air outlet and thereby intaking outside air from the air inlet into the box, a dividing portion for dividing the air discharged from the fan into two parts, and a return inlet formed between the air inlet and the air outlet for returning one of the two parts of the air divided by the dividing portion into the box.

6 Claims, 5 Drawing Sheets

SLUDGE DRYING APPARATUS

BACKGROUND OF THE INVENTION

Field of the Invention

The present invention relates to a sludge drying apparatus for drying a sludge.

Description of the Related Art

In grinding a workpiece by using abrasive members as supplying a grinding water, grinding dust is generated from the workpiece in the condition where it is mixed in the grinding water to form a waste fluid. The grinding dust (sludge) having a high water content is recovered by precipitating the sludge in the waste fluid or by immersing a positive plate and a negative plate in the waste fluid and next applying electric charges to the positive plate and the negative plate to thereby deposit the sludge on the positive plate. Further, the water left by removing the sludge from the waste fluid is reused (see Japanese Patent Laid-Open No. 2013-119050, for example). Further, in a sludge recovering apparatus as disclosed in Japanese Patent Laid-Open No. 2016-049506, the sludge recovered is dried to be used.

SUMMARY OF THE INVENTION

However, in the sludge recovering apparatus disclosed in Japanese Patent Laid-Open No 2016-049506, a heater is used to dry the sludge. Accordingly, when the maintenance of the sludge recovering apparatus is required, an operator must wait until any component heated by the heater is cooled. Further, electric power for operating the heater is required.

It is therefore an object of the present invention to provide a sludge drying apparatus which can dry a sludge without using a heater after recovering the sludge from a waste fluid.

In accordance with an aspect of the present invention, there is provided a sludge drying apparatus for recovering a sludge having a high water content from a waste fluid and then drying the sludge, the waste fluid containing powder of a workpiece ground by abrasive members in a condition where a grinding water is supplied to the workpiece, the sludge drying apparatus including: a waste fluid bath for storing the waste fluid; extracting means extracting the sludge from the waste fluid stored in the waste fluid bath; a transfer belt for transferring the sludge extracted by the extracting means to a recovery box; and drying means drying the sludge to be transferred by the transfer belt, in which the drying means includes a drying box configured so as to cover at least an upper surface of the transfer belt and extend in a direction of extension of the transfer belt, an air inlet formed at one end of the drying box in the direction of extension thereof, an air outlet formed at the other end of the drying box in the direction of extension thereof, a blower fan provided outside the drying box for sucking air in the drying box from the air outlet and thereby intaking outside air from the air inlet into the drying box, a dividing portion for dividing the air discharged from the blower fan into two parts, and a return inlet formed between the air inlet and the air outlet of the drying box for returning one of the two parts of the air divided by the dividing portion into the drying box, and wherein the one of the two parts of the air divided by the dividing portion is returned from the return inlet into the drying box, and the outside air continues to be taken from the air inlet into the drying box by a same amount as a flow rate of the other part of the air divided by the dividing portion, thereby drying the sludge being transferred on the upper surface of the transfer belt.

According to the present invention, a part of the air divided by the dividing portion (the air being warmed by the blower fan) is returned from the return inlet into the drying box. Further, the outside air is taken from the air inlet into the drying box by the same amount as the flow rate of the other part of the air divided by the dividing portion. Accordingly, the sludge being transferred by the transfer belt in the drying box can be efficiently dried by the flow of the mixture gas of the air returned from the return inlet and the outside air taken from the air inlet into the drying box. Further, in drying the sludge, an increase in concentration of hydrogen in the drying box can be suppressed to thereby prevent hydrogen explosion. Furthermore, since no heater is used in drying the sludge, power consumption in the sludge drying apparatus can be suppressed and the sludge can be dried without being melted by the heat from a heater. In addition, it is unnecessary for an operator to wait in exchanging the transfer belt or cleaning the inside of the drying box.

The above and other objects, features, and advantages of the present invention and the manner of realizing them will become more apparent, and the invention itself will best be understood from a study of the following description and an appended claim with reference to the attached drawings showing a preferred embodiment of the invention.

DETAILED DESCRIPTION OF THE PREFERRED EMBODIMENT

Figure 1:
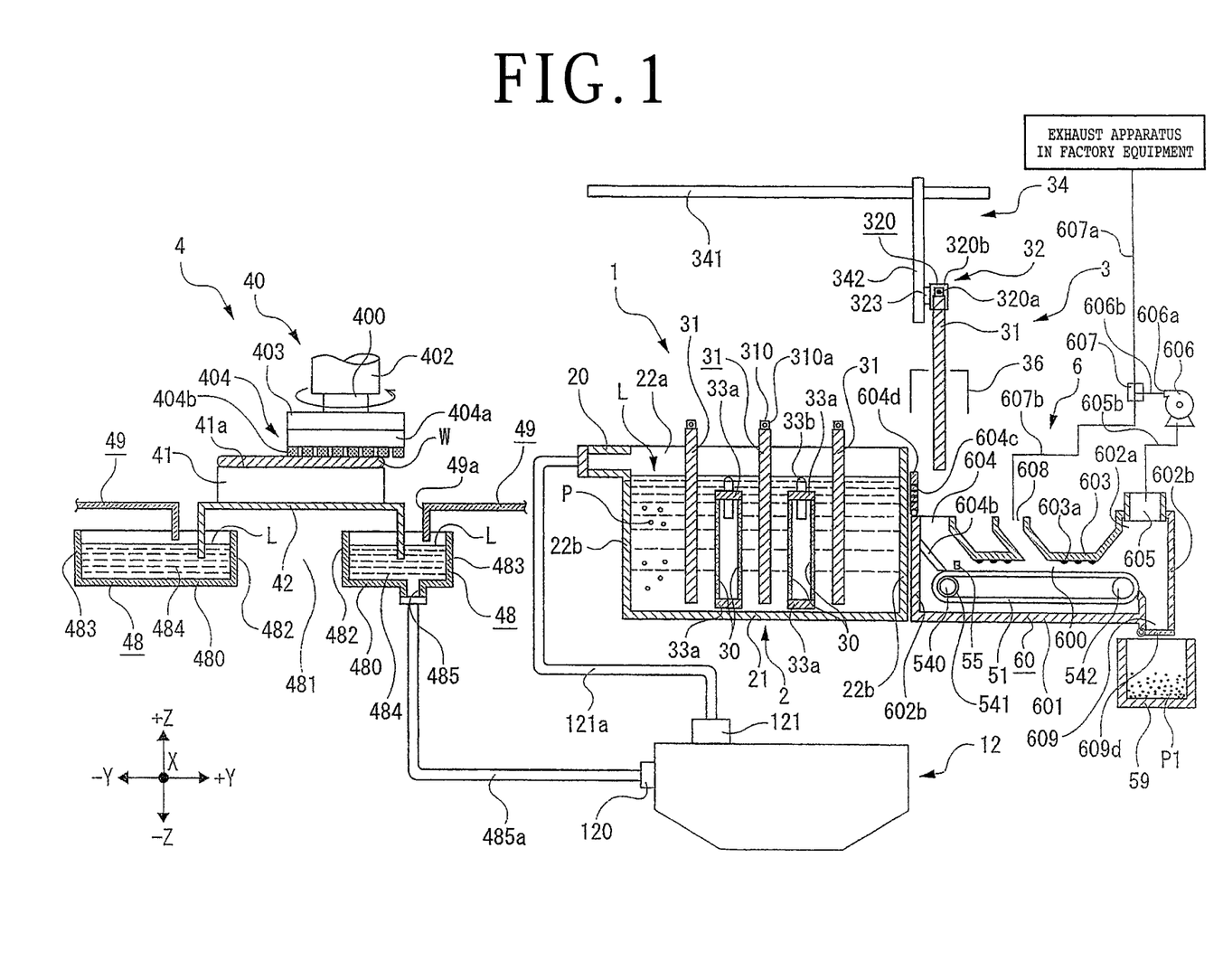
FIG. 1 is a sectional view depicting the structure of a grinding apparatus and a sludge drying apparatus according to a preferred embodiment of the present invention.

Referring to FIG. 1, a sludge drying apparatus 1 according to a preferred embodiment of the present invention is depicted. A grinding apparatus 4 having abrasive members 404b is provided near the sludge drying apparatus 1. In the grinding apparatus 4, a workpiece W is ground by the abrasive members 404b in the condition where a grinding water is supplied to the workpiece W. Accordingly a waste fluid L containing powder of the workpiece W ground by the abrasive members 404b is discharged from the grinding apparatus 4. The sludge drying apparatus 1 is an apparatus for recovering a sludge having a high water content from the waste fluid L and then drying the sludge. While the sludge drying apparatus 1 is separate from the grinding apparatus 4 in this preferred embodiment, the sludge drying apparatus 1 may be incorporated in the grinding apparatus 4. As a modification, the sludge drying apparatus 1 may be connected to a cutting apparatus having a rotatable cutting blade for cutting the workpiece W as supplying a cutting water to the workpiece W, in which a sludge containing a high water content is recovered from a waste fluid discharged from the cutting apparatus.

The grinding apparatus 4 depicted in FIG. 1 essentially includes a holding table 41 for holding the workpiece W as a solid material and a grinding unit 40 including a rotatable grinding wheel 404 having the abrasive members 404b grinding the workpiece W. While the workpiece W is a silicon wafer in this preferred embodiment, the workpiece W may be a silicon ingot as a solid cylindrical workpiece.

The grinding apparatus 4 includes a base 49 having an upper opening 49a. The holding table 41 is provided on the base 49. The holding table 41 has a holding surface 41a formed from a porous member or the like. The holding surface 41a is connected to a vacuum source (not depicted). The holding table 41 is rotatable about its axis extending in the Z direction. The holding table 41 is supported by a table support 42 provided in the upper opening 49a of the base 49. The table support 42 is movable in the X direction (in the direction perpendicular to the sheet plane of FIG. 1) by an X moving mechanism (not depicted) including a motor and a ball screw mechanism.

A boxlike water case 48 for receiving the waste fluid L from the grinding unit 40 is provided below the holding table 41. A part of the water case 48 is depicted on both sides of the path of movement of the holding table 41, that is, along the opposite side surfaces of the table support 42 in the Y direction. Although not depicted, the other part of the water case 48 is provided along the opposite side surfaces of the table support 42 in the X direction. That is, the water case 48 has a gutter portion 484 for receiving the waste fluid L. The gutter portion 484 has a rectangular shape as viewed in plan in such a manner that a central rectangular opening 481 is defined. The gutter portion 484 is composed of a bottom plate 480, an inside wall 482, and an outside wall 483. Accordingly, the central opening 481 is surrounded by the inside wall 482. The inside wall 482 and the outside wall 483 are connected at their lower ends to the bottom plate 480 to thereby define a rectangular ring space for storing the waste fluid L. The bottom plate 480 is formed with a drain opening 485 for discharging the waste fluid L. A drain pipe 485a is connected at one end thereof to the drain opening 485. The other end of the drain pipe 485a is connected to a tank 12 for storing the waste fluid L. Accordingly, the waste fluid L containing the powder (e.g., silicon powder) of the workpiece W ground by the abrasive members 404b falls down from the holding table 41 and is received by the gutter portion 484 of the water case 48. Thereafter, the waste fluid L is sent from the drain opening 485 through the drain pipe 485a to the tank 12.

The grinding unit 40 depicted in FIG. 1 includes a spindle 400 having an axis extending in the Z direction perpendicular to the holding surface 41a of the holding table 41, a motor 402 for rotationally driving the spindle 400, a mount 403 fixed to the lower end of the spindle 400, and the grinding wheel 404 detachably connected to the mount 403. The grinding wheel 404 is composed of an annular wheel base 404a and a plurality of abrasive members 404b fixed to the lower surface of the wheel base 404a so as to be arranged annularly at given intervals. Each abrasive member 404b has an outside shape like a substantially rectangular prism. Each abrasive member 404b is formed by binding diamond abrasive grains or the like with a suitable bond. The grinding unit 40 is vertically movable in the Z direction.

A water passage (not depicted) for supplying a grinding water is formed inside the spindle 400 so as to extend in the axial direction (Z direction) of the spindle 400. The water passage is connected to a grinding water source (not depicted). The water passage opens to the lower surface of the wheel base 404a so as to discharge the grinding water toward the abrasive members 404b. As a modification, a grinding water nozzle may be provided at a position adjacent to the grinding wheel 404 of the grinding unit 40 in the condition where the grinding unit 40 is lowered to a grinding position for grinding the workpiece W. In this case, the grinding water is supplied from the grinding water nozzle to the position where the abrasive members 404b come into contact with the workpiece W.

The sludge drying apparatus 1 includes a waste fluid bath 2 for storing the waste fluid L, extracting means 3 extracting a sludge P having a high water content from the waste fluid L stored in the waste fluid bath 2, a transfer belt 51 for transferring the sludge P extracted by the extracting means 3 to a recovery box 59, and drying means 6 drying the sludge P to be transferred by the transfer belt 51.

The tank 12 for storing the waste fluid L is located at a level lower than that of the drain opening 485 of the water case 48. The tank 12 has an inlet opening 120. One end of the drain pipe 485a is connected to the drain opening 485, and the other end of the drain pipe 485a is connected to the inlet opening 120 of the tank 12. The tank 12 also has a delivery pump 121 for raising the waste fluid L containing the sludge P and sending it to the waste fluid bath 2. That is, the delivery pump 121 functions to send the waste fluid L containing the sludge P from the tank 12 through a delivery pipe 121a to the waste fluid bath 2. The waste fluid bath 2 has an inlet opening 20 connected to the delivery pipe 121a.

The waste fluid bath 2 has an outside shape like a rectangular prism and it is formed of an insulating material such as synthetic resin. The waste fluid bath 2 is composed of a bottom plate 21 having a rectangular shape as viewed in plan and four side walls rising from the outer edge of the bottom plate 21 in the +Z direction, thereby defining a space for storing the waste fluid L containing the sludge P. These four side walls are a pair of side walls 22a opposed to each other in the X direction (one of the side walls 22a on the back side of the sheet plane of FIG. 1 being depicted) and a pair of side walls 22b opposed to each other in the Y direction. Further, an overflow pipe (not depicted) for preventing the overflow of the waste fluid L is provided at an upper portion of the waste fluid bath 2. This overflow pipe is connected to the tank 12, so that the waste fluid L before overflowing from the waste fluid bath 2 can be returned through the overflow pipe to the tank 12.

The extracting means 3 extracting the sludge P having a high water content from the waste fluid L stored in the waste fluid bath 2 includes a plurality of negative plates 30 provided in the waste fluid bath 2 and adapted to be negatively charged, a plurality of positive plates 31 opposed to the negative plates 30 and adapted to be positively charged to attract the sludge P having a high water content, each positive plate 31 being removable from the waste fluid bath 2, handling means 32 having a holding portion 320 for holding each positive plate 31, the holding portion 320 being vertically movable to take each positive plate 31 out of the waste fluid bath 2 or to put each positive plate 31 into the waste fluid bath 2, and scraping means 36 scraping the sludge P off each positive plate 31 taken out of the waste fluid bath 2 by the handling means 32.

Each positive plate 31 is formed of an electrochemically noble material such as copper, silver, platinum, or gold. In this preferred embodiment, each positive plate 31 is formed of stainless steel. Each positive plate 31 is a rectangular flat plate member.

A plurality of support grooves (not depicted) are formed on the inner surfaces of the two side walls 22a of the waste fluid bath 2, the two side walls 22a being opposed to each other in the X direction. The plural support grooves formed on each side wall 22a are spaced at given intervals in the Y direction. The plural positive plates 31 are loosely inserted in these plural support grooves and thereby arranged at given intervals in the Y direction in the waste fluid bath 2. That is, the plural positive plates 31 are arranged at given intervals in the Y direction in the condition where the both side surfaces of each positive plate 31 are perpendicular to the Y direction, i.e., parallel to the X direction. Two projections 310 are formed on the upper end surface of each positive plate 31 at a central portion so as to be spaced from each other in the X direction (one of the two projections 310 being depicted). Each projection 310 is a rectangular plate portion and has a central through hole 310a extending in the X direction. The through hole 310a of each projection 310 is adapted to engage a pin 320a included in the holding portion 320 of the handling means 32.

Each negative plate 30 is interposed between the adjacent positive plates 31. That is, each negative plate 30 is opposed in parallel to the adjacent positive plates 31 in the Y direction so as to be spaced a given distance therefrom. Thus, the plural negative plates 30 and the plural positive plates 31 are alternately arranged at given intervals in the Y direction.

For example, as depicted in FIG. 1, each negative plate 30 is supported by a frame 33a having a rectangular shape as viewed in side elevation (in the Y direction). The frame 33a has a given width in the Y direction. The frame 33a is provided with a pipe 33b for sending a clear water to a clear water storing tank (not depicted), the clear water being obtained by removing the sludge P from the waste fluid L and allowed to enter the inside space of the frame 33a. As depicted in FIG. 1, the frame 33a has a pair of rectangular openings on both sides, and a pair of negative plates 30 are mounted on the frame 33a so as to close the pair of rectangular openings. Accordingly, the pair of negative plates 30 supported to each frame 33a are spaced in parallel. Each frame 33a supporting the pair of negative plates 30 is interposed between the adjacent positive plates 31.

As similar to each positive plate 31, each negative plate 30 is formed of an electrochemically noble material such as copper, silver, platinum, or gold. In this preferred embodiment, each negative plate 30 is formed of stainless steel. Each negative plate 30 is a mesh plate, which is adapted to be negatively charged and thereby to generate a repulsive force to the sludge P. Accordingly, the sludge P is not caught by the mesh of each negative plate 30. That is, when each negative plate 30 is negatively charged, only the clear water in the waste fluid L is allowed to pass through each negative plate 30. The sludge P is negatively charged, so that a repulsive force is generated between the sludge P and each negative plate 30 and the pass of the sludge P through each negative plate 30 is restricted. Accordingly, the clear water passed through each negative plate 30 is stored in the inside space defined by each frame 33a and the two negative plates 30 supported to each frame 33a. Further, since a repulsive force is generated between each negative plate 30 and the sludge P, the inside space of each frame 33a can be isolated from the waste fluid L containing the sludge P in the waste fluid bath 2.

Further, a spacing having a predetermined amount is defined between the lower end of each frame 33a and the bottom plate 21 of the waste fluid bath 2, and a spacing having a predetermined amount is defined between the lower end of each positive plate 31 and the bottom plate 21 of the waste fluid bath 2. Accordingly, the waste fluid L supplied into the waste fluid bath 2 is allowed to pass through these spacings and allowed to rise in the space between the negative plate 30 and the positive plate 31 adjacent to each other.

Figure 2:
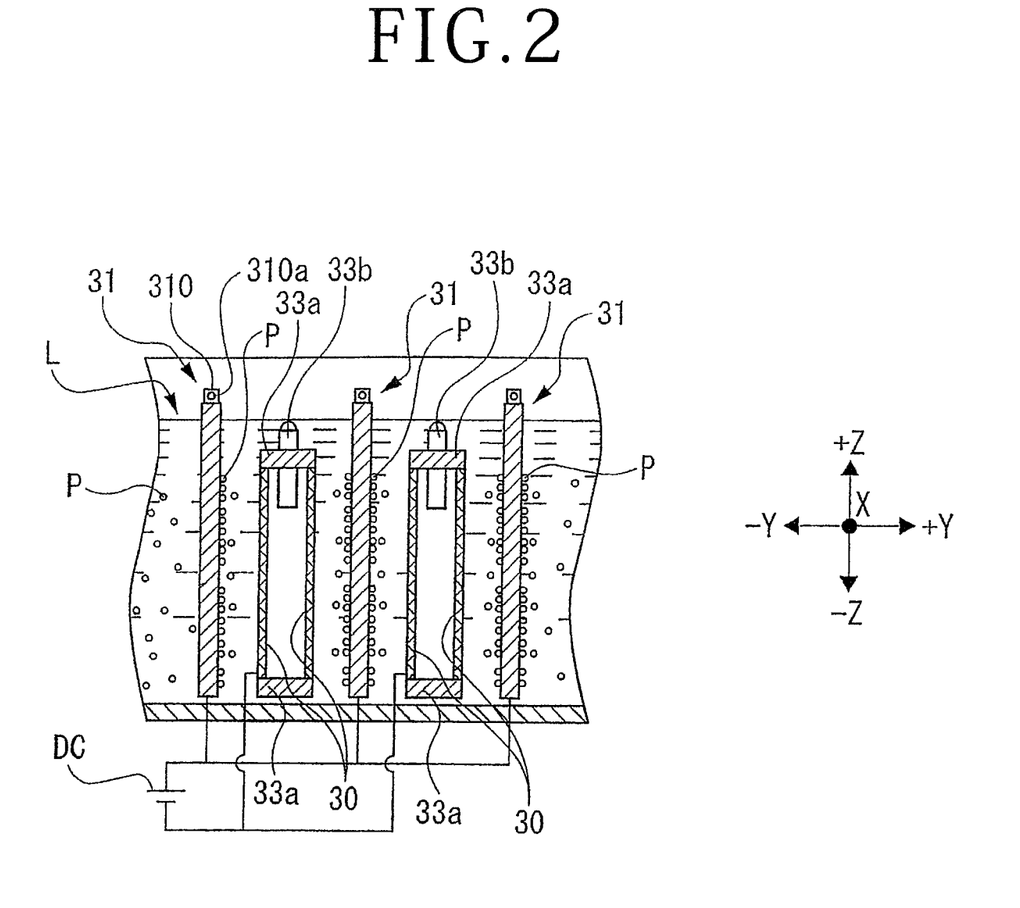
FIG. 2 is an enlarged sectional view depicting the arrangement of positive plates and negative plates in a waste fluid bath included in the sludge drying apparatus depicted in FIG. 1.

In this preferred embodiment, a direct-current voltage is applied between the positive plate 31 and the negative plate 30 adjacent to each other (see FIG. 2). That is, the positive electrode of a direct-current power supply DC is electrically connected to each positive plate 31, thereby positively charging each positive plate 31 in the waste fluid L. Accordingly, each positive plate 31 is positively charged in the waste fluid L to attract the sludge P negatively charged in the waste fluid L. On the other hand, the negative electrode of the direct-current power supply DC is electrically connected to each negative plate 30, thereby negatively charging each negative plate 30 in the waste fluid L.

Referring back to FIG. 1, the handling means 32 taking each positive plate 31 out of the waste fluid bath 2 and putting each positive plate 31 into the waste fluid bath 2 is horizontally movable in the Y direction above the waste fluid bath 2 by means of a Y moving mechanism 34. The Y moving mechanism 34 includes a base 341 extending in the Y direction, a vertical plate 342 extending in the Z direction, the vertical plate 342 being supported to the base 341 so as to be movable along the base 341 in the Y direction, and a ball screw mechanism (not depicted) for moving the vertical plate 342.

A movable member 323 is mounted on one side surface of the vertical plate 342, and the handling means 32 is adapted to be moved by the movable member 323 in the Z direction. The handling means 32 has a pair of holding portions 320 for holding each positive plate 31. For example, each holding portion 320 is configured by a chuck cylinder provided on the side surface of the movable member 323. The pair of holding portions 320 are opposed to each other in the X direction at a given interval. Each holding portion 320 includes a cylinder body 320b mounted on the movable member 323 and a pin 320a adapted to retractably project from the cylinder body 320b in the X direction. The two pins 320a of the pair of holding portions 320 are adapted to project from the respective cylinder bodies 320b toward each other in the X direction. When the movable member 323 is lowered to position the two holding portions 320 at the upper end of each positive plate 31, the two pins 320a are operated to project from the respective cylinder bodies 320b and come into engagement with the two through holes 310a of the respective projections 310 of each positive plate 31, respectively. Accordingly, each positive plate 31 is held by the two holding portions 320 of the handling means 32.

Figure 3:
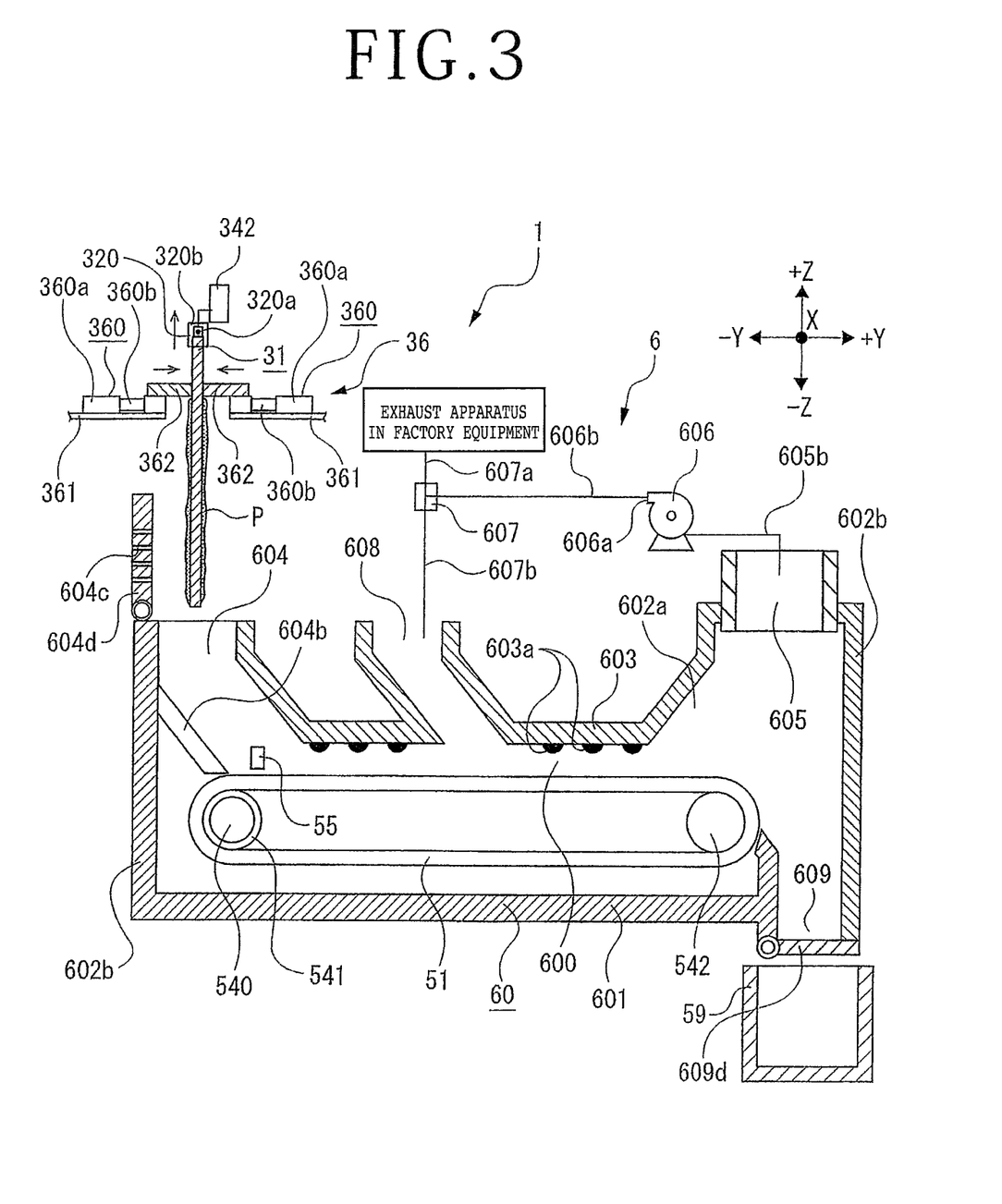
FIG. 3 is an enlarged sectional view depicting a condition that a sludge is deposited to the positive plate, which is next extracted from the waste fluid bath, and the sludge is to be dropped from the positive plate into a drying box.

The scraping means 36 scraping the sludge P off each positive plate 31 taken out of the waste fluid bath 2 by the handling means 32 is depicted simply in FIG. 1 and depicted in detail in FIG. 3. As depicted in FIG. 3, the scraping means 36 is provided above an air inlet 604 of a drying box 60 included in the drying means 6. The air inlet 604 is formed at one end of the drying box 60 in the −Y direction. The scraping means 36 includes a pair of cylinders 360 (motor-driven cylinders or air cylinders), a pair of support plates 361 for supporting the pair of cylinders 360, respectively, and a pair of scraping plates 362 adapted to be moved in the Y direction by the pair of cylinders 360, respectively.

Each cylinder 360 includes a cylinder tube 360a incorporating a piston (not depicted) and a piston rod 360b partially inserted in the cylinder tube 360a and having one end fixed to the piston. Each scraping plate 362 is fixed to the other end of the piston rod 360b of the corresponding cylinder 360. The pair of scraping plates 362 are opposed to each other in the Y direction in such a manner that each positive plate 31 can be interposed between the ends of the pair of scraping plates 362. Each scraping plate 362 extends in the X direction and has a length larger than the width of each positive plate 31 (the length in the X direction).

With this configuration, the opposite side surfaces of each positive plate 31 can be pinched by the pair of scraping plates 362 of the scraping means 36. In the condition where the opposite side surfaces of each positive plate 31 is pinched by the pair of scraping plates 362, the pair of holding portions 320 of the handling means 32 holding each positive plate 31 are raised. As a result, the sludge P having a high water content can be scraped off the opposite side surfaces of each positive plate 31 by the pair of scraping plates 362.

The drying means 6 removing the water from the sludge P is provided adjacent to the waste fluid bath 2. The sludge P having a high water content as extracted from the waste fluid L by the extracting means 3 is dried on the transfer belt 51 and transferred to the recovery box 59. The transfer belt 51 is provided in the drying box 60 of the drying means 6 so as to extend in the Y direction.

The drying means 6 drying the sludge P to be transferred by the transfer belt 51 includes a drying box 60 configured so as to cover at least the upper surface of the transfer belt 51 and extend in the direction (Y direction) of extension of the transfer belt 51, an air inlet 604 formed at one end of the drying box 60 in the Y direction, an air outlet 605 formed at the other end of the drying box 60 in the Y direction, a blower fan 606 provided outside the drying box 60 for sucking the air in the drying box 60 from the air outlet 605 and thereby intaking the outside air from the air inlet 604 into the drying box 60, a dividing portion 607 for dividing the exhaust air from the blower fan 606 into two parts, and a return inlet 608 formed between the air inlet 604 and the air outlet 605 of the drying box 60 for returning one of the two parts of the exhaust air divided by the dividing portion 607 into the drying box 60.

The drying box 60 has an outside shape like a rectangular prism. That is, the drying box 60 is composed of a rectangular bottom plate 601, four side walls rising from the outer edge of the bottom plate 601 in the +Z direction, and a top plate 603 connected to the upper ends of the four side walls and opposed to the upper surface of the transfer belt 51 in the direction (Z direction) perpendicular to the transfer direction. These four side walls are a pair of side walls 602a opposed to each other in the X direction (one of the side walls 602a on the back side of the sheet plane of FIG. 3 being depicted) and a pair of side walls 602b opposed to each other in the Y direction. The inside space of the drying box 60 includes an air passage 600 for passing the air in the transfer direction where the sludge P is transferred by the transfer belt 51.

The air inlet 604 is formed through the thickness of the top plate 603 at one end thereof in the −Y direction. The air inlet 604 also serves as an inlet for introducing the sludge P scraped from each positive plate 31 and dropped. Thus, the sludge P having a high water content is dropped through the air inlet 604 into the drying box 60. The air inlet 604 is provided with a lid 604d having a plurality of through holes 604c for allowing the pass of air. The lid 604d is hinged to the top plate 603, thereby opening and closing the air inlet 604. A guide plate 604b is provided below the air inlet 604.

The guide plate 604b is inclined so as to guide the sludge P dropped through the air inlet 604 to the upper surface of the transfer belt 51.

The transfer belt 51 is an endless belt and rotatably driven by a motor 540. The motor 540 is fixed to one of the pair of side walls 602a. A drive roller 541 is mounted on the shaft of the motor 540, and the transfer belt 51 is wrapped on the drive roller 541. The front end of the shaft of the motor 540 is supported to the other side wall 602a. A driven roller 542 is rotatably mounted on the side walls 602a at a position spaced a given distance from the motor 540 in the Y direction. The transfer belt 51 is also wrapped on the driven roller 542. Accordingly, when the motor 540 is operated to rotate the drive roller 541, the transfer belt 51 is moved to rotate the driven roller 542.

The drying means 6 further includes a squeegee 55 for spreading the sludge P placed on the transfer belt 51 in concert with the movement of the transfer belt 51, thereby flattening the sludge P into a platelike material having a given thickness. The squeegee 55 extends in the X direction, and both ends of the squeegee 55 are fixed to the side walls 602a.

The air outlet 605 for discharging the air and other gases from the drying box 60 is formed through the thickness of the top plate 603 at the other end thereof in the +Y direction. The air outlet 605 is connected through a discharge pipe 605b to an intake port 606p of the blower fan 606. A pipe 606b is connected at one end thereof to a discharge port 606a of the blower fan 606. The dividing portion 607 is connected to the other end of the pipe 606b. The dividing portion 607 functions to divide the flow rate of the exhaust gas from the blower fan 606 into two parts. For example, the dividing portion 607 is realized by a three-way valve capable of controlling the flow rate of the exhaust gas to be divided into an exhaust pipe 607a and a return pipe 607b. As a modification, the dividing portion 607 may be composed of a dividing pipe and a control valve capable of controlling the flow rate of the exhaust gas flowing in one of the discharge pipe 607a and the return pipe 607b. Further, as another modification, the flow rate of the exhaust gas may be divided according to the diameters of the discharge pipe 607a and the return pipe 607b.

Thus, one end of the discharge pipe 607a and one end of the return pipe 607b are connected to the dividing portion 607. The other end of the discharge pipe 607a is connected to an exhaust apparatus having suction means in factory equipment. The return pipe 607b functions to return a part of the exhaust gas divided by the dividing portion 607 to the drying box 60. The other end of the return pipe 607b is connected to the return inlet 608. The return inlet 608 is formed through the thickness of the top plate 603 at a position between the air inlet 604 and the air outlet 605.

A sludge outlet 609 is formed through the thickness of the bottom plate 601 at one end thereof in the +Y direction. The sludge P having a high water content is dried on the transfer belt 51 to obtain a dry sludge P1 (see FIG. 1). The dry sludge P1 is adapted to be dropped from the transfer belt 51 through the sludge outlet 609 into the recovery box 59. A lid 609d is pivotably mounted at the lower end of the sludge outlet 609 by a spring hinge.

The recovery box 59 is located below the sludge outlet 609 of the drying box 60. The recovery box 59 has an outside shape like a rectangular prism and opens at its upper end directly below the sludge outlet 609 of the drying box 60. A sensor (not depicted) such as a transmission type optical sensor is provided at an upper portion of the recovery box 59. The sensor functions to detect the amount of the dry sludge P1 stored in the recovery box 59. That is, when the dry sludge P1 is dropped from the transfer belt 51 into the recovery box 59 and stored up to a predetermined height in the recovery box 59, this condition is detected by the sensor to give an alarm indicating that the recovery box 59 is to be replaced.

A plurality of projections 603a for generating turbulence are formed on the lower surface of the top plate 603. In this preferred embodiment, each projection 603a has a semispherical outside shape as depicted in FIGS. 1 and 3. As a modification, each projection 603a may have a cylindrical or prismatic outside shape. While the plural projections 603a are arranged at equal intervals both in the X direction and in the Y direction in this preferred embodiment, the plural projections 603a may be arranged in a random fashion. Further, in the case that each projection 603a has a cylindrical or prismatic outside shape, the plural projections 603a may be arranged at equal intervals in the Y direction in the condition where the axis of each projection 603a extends in the X direction.

Owing to the presence of the projections 603a, the gas (air) flowing in the air passage 600 in the drying box 60 strikes the projections 603a formed on the lower surface of the top plate 603 of the drying box 60, thereby producing turbulence. That is, an irregular vortex of the gas is produced above the transfer belt 51 by the plural projections 603a and the gas in this condition flows in the transfer direction. As a result, the turbulence of the gas is blown against the sludge P having a high water content being transferred on the upper surface of the transfer belt 51, thereby facilitating the vaporization of water from the sludge P. However, the formation of the plural projections 603a on the lower surface of the top plate 603 is not essential.

The operation of the sludge drying apparatus 1 will now be described in the case that the workpiece W is ground by the abrasive members 404b in the condition where a grinding water is supplied to the workpiece W and that the sludge P having a high water content is recovered from the waste fluid L containing the powder of the workpiece W ground by the abrasive members 404b.

The workpiece W is first held on the holding surface 41a of the holding table 41 under suction. Thereafter, the table support 42 is moved to set the holding table 41 holding the workpiece W at the grinding position where the workpiece W is opposed to the abrasive members 404b.

The motor 402 is next operated to rotate the spindle 400 about its vertical axis extending in the Z direction, thereby rotating the grinding wheel 404. Thereafter, the grinding unit 40 is lowered until the abrasive members 404b come into contact with the upper surface of the workpiece W held on the holding table 41. At this time, the holding table 41 is also rotated at a predetermined speed to thereby rotate the workpiece W held on the holding surface 41a. Accordingly, the upper surface of the workpiece W is entirely ground by the abrasive members 404b. During this grinding operation, a grinding water is supplied to the position where the abrasive members 404b come into contact with the upper surface of the workpiece W, thereby cooling and cleaning the contact position.

In this manner, the workpiece W is ground to cause the generation of fine powder (silicon powder) from the workpiece W. This fine powder is mixed in the grinding water to produce the waste fluid L. The waste fluid L thus produced is allowed to flow through the upper opening 49a into the water case 48. Thereafter, the waste fluid L is sent through the drain pipe 485a to the tank 12 and then further sent through the delivery pipe 121a to the waste fluid bath 2. The waste fluid L is now stored in the waste fluid bath 2. The powder of the workpiece W absorbs the grinding water to become the sludge P having a high water content.

In the condition where the waste fluid L is stored in the waste fluid bath 2, the positive plates 31 and the negative plates 30 are immersed into the waste fluid L as depicted in FIG. 2. Thereafter, the positive electrode of the direct-current power supply DC is connected to the positive plates 31, and the negative electrode of the direct-current power supply DC is connected to the negative plates 30 to thereby positively charge the positive plates 31 and negatively charge the negative plates 30. As a result, an electric field is formed between the positive plate 31 and the negative plate 30 adjacent to each other. Accordingly, owing to electrophoresis, the sludge P mixed in the waste fluid L and negatively charged receives a repulsive force from the negative plates 30 negatively charged and an attractive force from the positive plates 31 positively charged.

After a given amount of sludge P is deposited on the positive plates 31, the Y moving mechanism 34 is operated to move the holding portions 320 of the handling means 32 to the position just above one of the positive plates 31. Thereafter, the holding portions 320 are lowered to hold this positive plate 31 and then raised to take this positive plate 31 out of the waste fluid L stored in the waste fluid bath 2. Thereafter, the Y moving mechanism 34 is operated to move the holding portions 320 holding the positive plate 31 to the position just above the air inlet 604 of the drying box 60.

Figure 4:
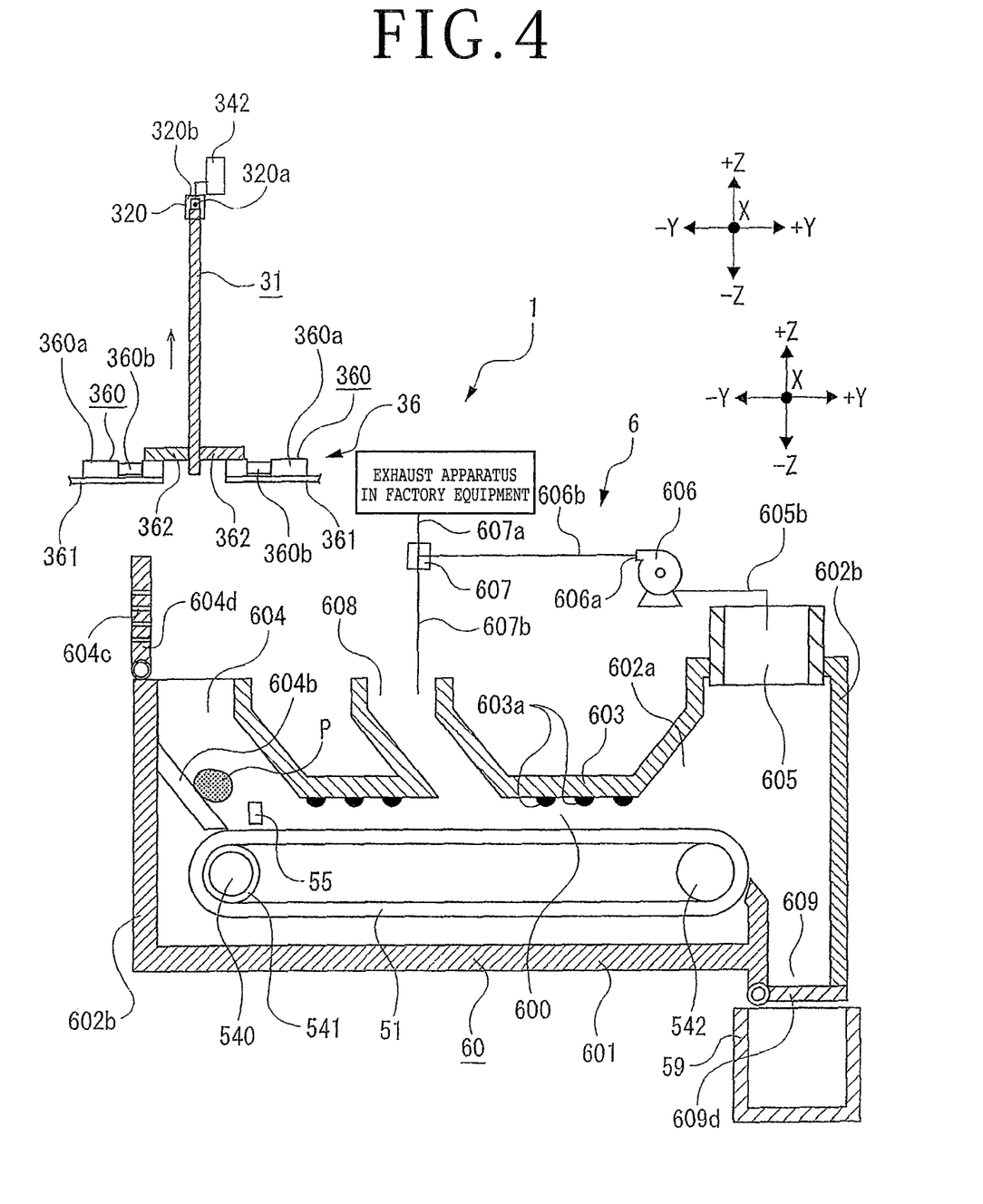
FIG. 4 is an enlarged sectional view depicting a condition that the sludge has just been dropped into the drying box.

Thereafter, the pair of cylinders 360 of the scraping means 36 are operated to horizontally move the pair of scraping plates 362 toward each other, thereby pinching the positive plate 31 between the pair of scraping plates 362 as depicted in FIG. 3. Thereafter, the movable member 323 (see FIG. 1) is operated to raise the holding portions 320, thereby raising the positive plate 31. As a result, the sludge P having a high water content is scraped off the positive plate 31 by the pair of scraping plates 362. Accordingly, as depicted in FIG. 4, the sludge P is dropped in the form of a lump from the positive plate 31 through the air inlet 604 of the drying box 60 onto the guide plate 604b provided in the drying box 60. The lump of the sludge P is moved to the upper surface of the transfer belt 51 due to the inclination of the guide plate 604b. At this time, the lid 604d is previously opened.

Figure 5:
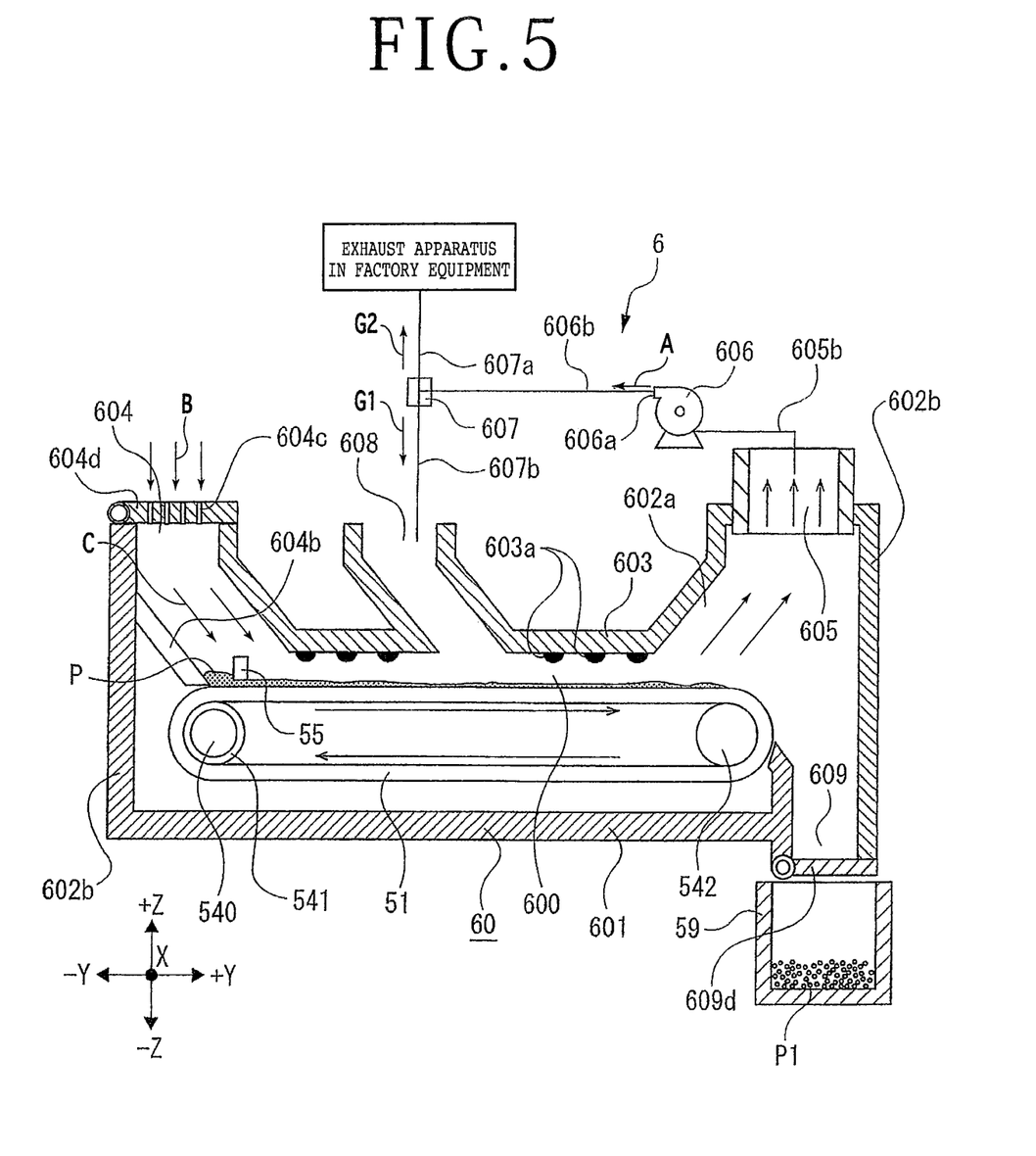
FIG. 5 is an enlarged sectional view depicting a condition that the sludge is being transferred by a transfer belt in drying the sludge.

After placing the lump of the sludge P on the upper surface of the transfer belt 51, the lid 604d is closed as depicted in FIG. 5. Thereafter, the motor 540 is operated to rotate the drive roller 541, thereby rotating the transfer belt 51 and the driven roller 542. As a result, the sludge P is transferred in the +Y direction by the transfer belt 51. At this time, the lump of the sludge P is passed through the spacing between the squeegee 55 and the transfer belt 51, so that the lump of the sludge P is spread on the transfer belt 51 to become a platelike material having a given thickness (e.g., 1 to 2 mm).

During the transfer of the sludge P having a high water content by the transfer belt 51, the blower fan 606 provided outside the drying box 60 is operated to suck the air (gas) in the drying box 60 from the air outlet 605. Accordingly, the outside air is taken from the through holes 604c of the lid 604d and the air inlet 604 into the drying box 60. The outside air thus taken into the drying box 60 is allowed to flow in the air passage 600 in the transfer direction (+Y direction). As a result, the water contained in the sludge P on the transfer belt 51 is vaporized, so that the sludge P is dried.

The flow rate of the air to be discharged from the blower fan 606 as depicted by an arrow A is set to 10 $m^3$/min, for example. The exhaust gas G discharged from the discharge port 606a of the blower fan 606 to the pipe 606b is divided into an exhaust gas G1 (flow rate of 5 m³/min) and an exhaust gas G2 (flow rate of 5 m³/min) by the dividing portion 607, in which the exhaust gas G1 is returned to the drying box 60, and the exhaust gas G2 is sent to the exhaust apparatus in the factory equipment. The exhaust gas G absorbs heat generated from a motor (not depicted) in the blower fan 606, so that the temperature of the exhaust gas G rises by five to six degrees from the temperature of the intake air. Accordingly, the temperature of the exhaust gas G1 is higher by five to six degrees than the temperature of the outside air taken from the air inlet 604 into the drying box 60. The exhaust gas G1 is returned through the return pipe 607b and the return inlet 608 into the drying box 60. The ratio between the flow rate of the exhaust gas G1 and the flow rate of the exhaust gas G2 is not limited to 1:1.

In this manner, the exhaust gas G1 as a part of the exhaust gas G divided by the dividing portion 607 is returned from the return inlet 608 into the drying box 60, and the air continues to be sucked from the air outlet 605 of the drying box 60 by the blower fan 606. To maintain the air pressure in the drying box 60 at a constant level, the outside air is taken from the air inlet 604 into the drying box 60 as depicted by arrows B and C by the same amount (e.g., flow rate of 5 m³/min) as the flow rate of the exhaust gas G2 as the other part of the exhaust gas G divided by the dividing portion 607. Thereafter, the exhaust gas G1 returned from the return inlet 608 and the outside air taken from the air inlet 604 are mixed with each other in the drying box 60 and the mixture gas obtained is allowed to flow in the air passage 600 in the transfer direction (+Y direction). Thus, the water contained in the sludge P on the transfer belt 51 is vaporized by the flow of this mixture gas, so that the sludge P is efficiently dried.

As described above, in the sludge drying apparatus 1 according to this preferred embodiment, the exhaust gas G1 as a part of the exhaust gas G divided by the dividing portion 607 (the exhaust gas G being warmed in the blower fan 606) is returned from the return inlet 608 into the drying box 60. Further, the outside air is taken from the air inlet 604 into the drying box 60 by the same amount as the flow rate of the exhaust gas G2 as the other part of the exhaust gas G divided by the dividing portion 607. Accordingly, the sludge P being transferred by the transfer belt 51 in the drying box 60 can be efficiently dried by the flow of the mixture gas of the exhaust gas G1 and the outside air taken into the drying box 60. Further, in drying the sludge P, hydrogen is generated in the drying box 60 due to the contact of the air and the sludge P. However, unlike the case of heater drying, the hydrogen generated is not accumulated in the drying box 60. That is, an increase in concentration of the hydrogen in the drying box 60 can be suppressed to thereby prevent hydrogen explosion. Furthermore, since no heater is used in drying the sludge P, power consumption in the sludge drying apparatus 1 can be suppressed and the sludge P can be dried without being melted by the heat from a heater. That is, adherence of the sludge P to the transfer belt 51 can be prevented and it is unnecessary for an operator to wait in exchanging the transfer belt 51 or cleaning the inside of the drying box 60. Further, the amount of exhaust gas to be sent to the exhaust apparatus in the factory equipment can also be reduced to thereby reduce a load on the exhaust apparatus in the factory equipment.

By removing the water from the sludge P having a high water content as mentioned above, only the dry sludge P1 is left on the transfer belt 51. When the dry sludge P1 on the transfer belt 51 comes beyond the driven roller 542, the dry sludge P1 is dropped toward the recovery box 59. At this time, the lid 609d is opened by the weight of the dry sludge P1, so that the dry sludge P1 is recovered into the recovery box 59.

The present invention is not limited to the sludge drying apparatus 1 according to the above preferred embodiment, but various modifications may be made without departing from the scope of the present invention. Further, the components of the sludge drying apparatus 1 and the grinding apparatus 4 depicted in the attached drawings are not limited in shape etc., but various modifications may be made within the scope where the effect of the present invention can be exhibited.

The present invention is not limited to the details of the above described preferred embodiment. The scope of the invention is defined by the appended claim and all changes and modifications as fall within the equivalence of the scope of the claim are therefore to be embraced by the invention.

What is claimed is:

1. A sludge drying apparatus for recovering a sludge from a waste fluid and then drying the sludge, the waste fluid containing powder of a workpiece ground by abrasive members in a condition where a grinding water is supplied to the workpiece, the sludge drying apparatus comprising:
   a waste fluid bath for storing the waste fluid;
   a recovery box for storing the dried sludge;
   extracting means for extracting the sludge from the waste fluid stored in the waste fluid bath;
   a transfer belt for transferring the sludge extracted by the extracting means to the recovery box; and
   drying means drying the sludge to be transferred by the transfer belt, wherein the drying means includes
      a drying box configured so as to cover at least an upper surface of the transfer belt and extend in a direction of extension of the transfer belt,
      an air inlet formed at one end of the drying box in the direction of extension of the transfer belt,
      an air outlet formed at the other end of the drying box in the direction of extension of the transfer belt,
      a blower fan provided outside the drying box for sucking air in the drying box from the air outlet, thereby intaking outside air through the air inlet into the drying box,
      a dividing portion for dividing the air discharged from the blower fan into two parts, and
      a return inlet formed between the air inlet and the air outlet of the drying box for returning one of the two parts of the air divided by the dividing portion into the drying box,
      wherein the drying box comprises a top plate having a lower surface opposed to the upper surface of the transfer belt, and the air inlet and the air outlet are formed through the thickness of the top plate, and
      wherein a plurality of projections are formed on the lower surface of the top plate for generating turbulence in the air flowing through the drying box.

2. The sludge drying apparatus as defined in claim 1, wherein at least one of the plurality of projections is formed between the air inlet and the return inlet, and at least one of the plurality of projections is formed between the return inlet and the air outlet.

3. The sludge drying apparatus as defined in claim 1, wherein the projections have a semispherical shape.

4. The sludge drying apparatus as defined in claim 1, wherein the projections have a cylindrical shape.

5. The sludge drying apparatus as defined in claim 1, wherein the projections have a prismatic shape.

6. The sludge drying apparatus as defined in claim 1, further comprising a lid having a plurality of through holes and operatively configured to open and close the air inlet.

* * * * *